United States Patent
Kuo

(10) Patent No.: US 10,798,366 B2
(45) Date of Patent: Oct. 6, 2020

(54) MOTION DETECTION DEVICE AND MOTION DETECTION METHOD

(71) Applicant: Sercomm Corporation, Taipei (TW)

(72) Inventor: Chih-Sheng Kuo, Taipei (TW)

(73) Assignee: SERCOMM CORPORATION, Taipei (TW)

( * ) Notice: Subject to any disclaimer, the term of this patent is extended or adjusted under 35 U.S.C. 154(b) by 212 days.

(21) Appl. No.: 14/828,596

(22) Filed: Aug. 18, 2015

(65) Prior Publication Data

US 2016/0086345 A1     Mar. 24, 2016

(30) Foreign Application Priority Data

Sep. 24, 2014  (CN) .......................... 2014 1 0494223

(51) Int. Cl.
| | |
|---|---|
| *H04N 13/271* | (2018.01) |
| *G06T 7/579* | (2017.01) |
| *H04N 13/243* | (2018.01) |
| *H04N 5/222* | (2006.01) |
| *G06T 7/73* | (2017.01) |
| *H04N 5/225* | (2006.01) |

(Continued)

(52) U.S. Cl.
CPC ............ *H04N 13/271* (2018.05); *G06T 7/579* (2017.01); *G06T 7/74* (2017.01); *H04N 5/2226* (2013.01); *H04N 5/2258* (2013.01); *H04N 13/239* (2018.05); *H04N 13/243* (2018.05); *G06T 2207/10016* (2013.01); *G06T 2207/30196* (2013.01); *G06T 2207/30232* (2013.01); *G06T 2207/30241* (2013.01); *H04N 2013/0081* (2013.01)

(58) Field of Classification Search
None
See application file for complete search history.

(56) References Cited

U.S. PATENT DOCUMENTS

| | | | | |
|---|---|---|---|---|
| 8,745,541 | B2 * | 6/2014 | Wilson | .................... G06F 3/011 715/863 |
| 8,937,646 | B1 * | 1/2015 | Baldwin | ................ H04N 5/262 348/47 |
| 9,232,151 | B1 * | 1/2016 | Azuma | ................ H04N 5/2258 |

(Continued)

FOREIGN PATENT DOCUMENTS

| | | |
|---|---|---|
| CN | 102024263 A | 4/2011 |
| CN | 103716579 A | 4/2014 |

OTHER PUBLICATIONS

SIPO Office Action dated Dec. 19, 2016 in corresponding Chinese application (No. 201410494223.8).

*Primary Examiner* — Chikaodili E Anyikire
(74) *Attorney, Agent, or Firm* — McClure, Qualey & Rodack, LLP

(57) ABSTRACT

A motion detection device is provided. The motion detection device includes a first image recording unit, a first storage unit, a motion detection unit, a depth calculation unit, and a determination unit. The first image recording unit is configured to record a first video. The first storage unit is configured to store the first video. The motion detection unit is configured to detect a moving object in the first video. The depth calculation unit is configured to calculate a depth of the moving object. The determination unit is configured to determine whether or not the moving object is a concerned event according to the depth of the moving object.

6 Claims, 3 Drawing Sheets

(51) Int. Cl.
*H04N 13/239* (2018.01)
*H04N 13/00* (2018.01)

(56) References Cited

U.S. PATENT DOCUMENTS

| | | | |
|---|---|---|---|
| 2004/0023612 A1* | 2/2004 | Kriesel | A01K 11/008 |
| | | | 452/157 |
| 2010/0315505 A1 | 12/2010 | Michalke et al. | |
| 2011/0069155 A1 | 3/2011 | Cho et al. | |
| 2011/0150271 A1 | 6/2011 | Lee et al. | |
| 2011/0221869 A1* | 9/2011 | Yamaya | H04N 13/0239 |
| | | | 348/47 |
| 2012/0076361 A1* | 3/2012 | Fujiyoshi | G01S 7/4802 |
| | | | 382/103 |
| 2012/0089949 A1 | 4/2012 | Chen et al. | |
| 2012/0146902 A1* | 6/2012 | Adermann | G06T 7/20 |
| | | | 345/158 |
| 2012/0169848 A1* | 7/2012 | Bae | G01S 17/89 |
| | | | 348/46 |
| 2012/0177254 A1 | 7/2012 | Lee et al. | |
| 2012/0293402 A1* | 11/2012 | Harrison | G06F 3/017 |
| | | | 345/156 |
| 2013/0083003 A1* | 4/2013 | Perez | G06F 3/005 |
| | | | 345/419 |
| 2013/0129155 A1 | 5/2013 | Lee et al. | |
| 2013/0182905 A1* | 7/2013 | Myers | A61B 5/1113 |
| | | | 382/103 |
| 2014/0071245 A1* | 3/2014 | Zhang | H04N 13/239 |
| | | | 348/47 |
| 2014/0119603 A1* | 5/2014 | Jin | G06T 7/254 |
| | | | 382/103 |
| 2014/0140416 A1* | 5/2014 | Yamazaki | H04N 19/70 |
| | | | 375/240.25 |
| 2014/0168424 A1 | 6/2014 | Attar et al. | |
| 2014/0355831 A1* | 12/2014 | Han | G06T 7/0081 |
| | | | 382/103 |
| 2015/0002734 A1* | 1/2015 | Lee | H04N 5/3532 |
| | | | 348/367 |
| 2015/0055828 A1* | 2/2015 | Zhao | G06T 7/20 |
| | | | 382/103 |
| 2015/0227784 A1* | 8/2015 | Roy | G06K 9/00201 |
| | | | 382/103 |
| 2016/0086345 A1* | 3/2016 | Kuo | H04N 13/271 |
| | | | 348/47 |

* cited by examiner

MOTION DETECTION DEVICE AND MOTION DETECTION METHOD

This application claims the benefit of People's Republic of China application Serial No. 201410494223.8, filed Sep. 24, 2014, the subject matter of which is incorporated herein by reference.

BACKGROUND

1. Field of the Invention

The disclosure relates in general to a motion detection device and method, and more particularly to a motion detection device and method capable of reducing false determination results.

2. Related Art

As technology advances and people increase security awareness, Internet protocol (IP) cameras have been widely used in recent years. IP cameras record digital videos and are usually used in surveillance systems, such as home surveillance systems. IP cameras send and receive data via network connection and thus users can setup and obtain video data easily. IP cameras may use a motion detection method to identify when and where a moving object appears in the video. There is a need for providing a more reliable motion detection method.

SUMMARY

The disclosure is directed to a motion detection device and a motion detection method. One of the advantages of the motion detection device is to reduce the possibility of false alarms and determine concerned events more accurately.

According to one embodiment of the invention, a motion detection device is provided. The motion detection device includes a first image recording unit, a first storage unit, a motion detection unit, a depth calculation unit, and a determination unit. The first image recording unit is configured to record a first video. The first storage unit is configured to store the first video. The motion detection unit is configured to detect a moving object in the first video. The depth calculation unit is configured to calculate a depth of the moving object. The determination unit is configured to determine whether or not the moving object is a concerned event according to the depth of the moving object.

According to another embodiment of the invention, a motion detection method is provided. The motion detection method includes the following steps: recording a first video, detecting a moving object in the first video, calculating a depth of the moving object, and determining whether or not the moving object is a concerned event according to the depth of the moving object.

The invention will become apparent from the following detailed description of the preferred but non-limiting embodiments. The following description is made with reference to the accompanying drawings.

Figure 1:
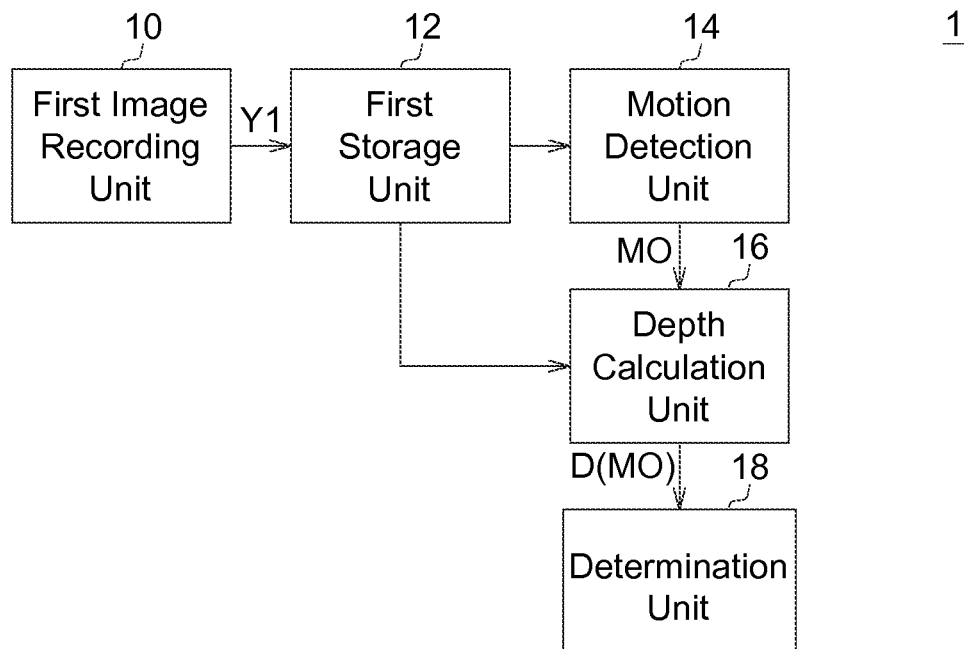
FIG. 1 shows a block diagram of a motion detection device according to the first embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

IP cameras are generally used for surveillance purposes. For example, IP cameras may perform motion detection to detect a moving object in the video, such as a person approaching the front door, in order to extract useful information for the user. General motion detection method may result in excessive image frames regarded as containing motions. Examples of such false alarms include tree leaves shaking in the background, clouds moving in the sky, and a distant car moving. These "motions" are just objects moving in background and are usually not the real motions that users are interested in. However the frame extraction mode is still activated due to these events that need not to be detected. These events result in too frequent false alarms, which cause inconvenience to the user. A motion detection method and a motion detection device using the same are provided in this disclosure to reduce the false alarms.

The First Embodiment

FIG. 1 shows a block diagram of a motion detection device 1 according to the first embodiment of the invention. The motion detection device 1 includes a first image recording unit 10, a first storage unit 12, a motion detection unit 14, a depth calculation unit 16, and a determination unit 18. The first image recording unit 10 is configured to record a first video Y1. The first storage unit 12 is configured to store the first video Y1. The motion detection unit 14 is configured to detect a moving object MO in the first video Y1. The depth calculation unit 16 is configured to calculate a depth D(MO) of the moving object MO. The determination unit 18 is configured to determine whether or not the moving object MO is a concerned event according to the depth of the moving object.

The motion detection device 1 may generally be used in a surveillance system that requires motion detection or people detection capability. The motion detection device 1 may constitute a part of an IP camera or a part of a closed-circuit television (CCTV).

The first image recording unit 10 includes a lens and an image sensor. The image sensor may be a charge-coupled device (CCD) or a complementary metal-oxide-semiconductor (CMOS) sensor.

The first storage unit 12 may be a memory device, such as random access memory (RAM) in the motion detection device 1. The first storage unit 12 stores the first video Y1 received from the first image recording unit 10.

The motion detection unit 14 reads the first video Y1 stored in the first storage unit 12 and performs motion detection to detect whether or not a motion exists in the first video Y1. If yes, a moving object MO is detected in the first video Y1. There may be several ways to implement motion detection. One example is to compare the recorded raw image of two consecutive video frames. Another example is to analyze the motion vectors generated during the video encoding process, such as MPEG4, H.264, H.265, or any video encoding process utilizing motion compensation. The motion detection unit 14 in this disclosure may adopt any available motion detection techniques.

If a motion exists in the first video Y1, a moving object MO will be detected after the motion detection unit 14 performs motion detection. In real cases there may be several moving objects in the first video Y1. A single moving object MO is taken as an example in the following description for a better understanding of the motion detection device proposed herein. As for the video with multiple moving objects, each moving object may be applied the same method as that applied to the moving object MO. The moving object MO may be a person, a ball, or a block of pixels in the first video Y1. The moving object MO is not necessarily a concrete object.

The depth calculation unit 16 calculates the depth of the moving object D(MO) in the first video Y1 to estimate the distance between the moving object MO and the first image recording unit 10. The depth calculation unit 16 may adopt any available depth calculation techniques, including depth estimation from a single image, and depth estimation from multiple images captured from different angles.

There may be several ways to implement the interaction between the depth calculation unit 16 and the motion detection unit 14. For example, the moving object MO may be detected first and then the depth of the moving object D(MO) is calculated. Alternatively the depth map of the entire image may be calculated first. The motion detection step is performed while generating the depth map to detect the motion object MO. And then the depth of the moving object D(MO) is obtained according to the location of the moving object MO in the depth map.

The determination unit 18 determines whether or not the moving object MO is a concerned event according to the depth of the moving object D(MO). For example, when the depth of the moving object D(MO) is within a predetermined distance range (such as smaller than a predetermined threshold distance $D_{th}$), the determination unit 18 determines the moving object MO as a concerned event. Then the determination unit 18 may send alert, such as e-mail or message, to the user or a security company, or send message to a cloud server to caution a concerned event has occurred.

Generally speaking, for an IP camera used in a surveillance system, the events of particular interest are the events happening near the IP camera. The events happening far away from the IP camera may be neglected. A motion is regarded as a concerned event only when the depth of the moving object D(MO) is smaller than the predetermined threshold distance $D_{th}$. Since the motions with too large depth are filtered out, false alarms can be effectively reduced. The motion detection method prevents frequent notifications sent to the user. Therefore the user does not have to examine video clips frequently while most of the clips do not contain real concerned events. Not only better convenience is achieved, but also the storage space as well as the network bandwidth is saved effectively.

Figure 5:
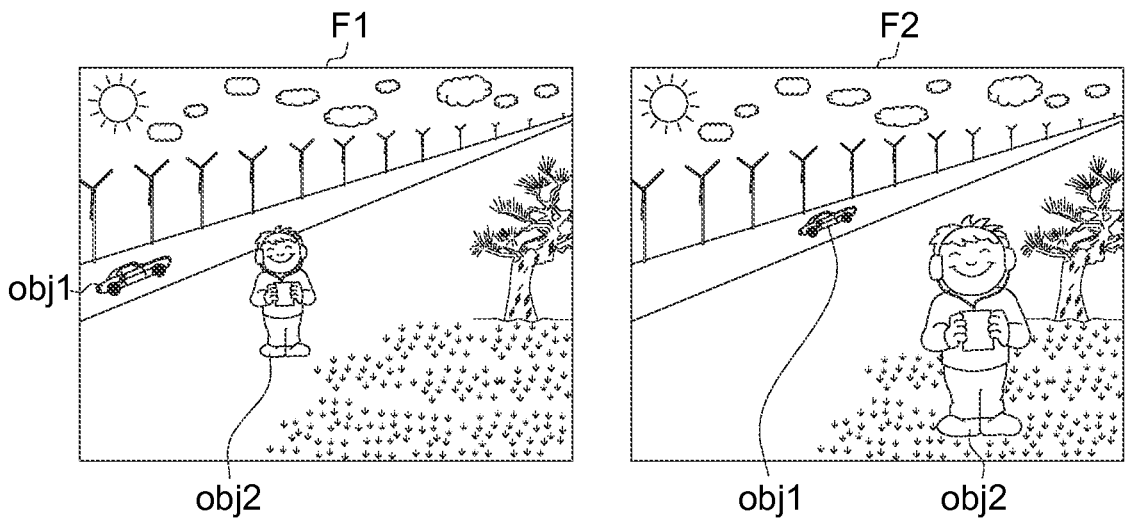
FIG. 5 shows an example of the motion detection method applied to an input image according to one embodiment of the invention.

FIG. 5 shows an example of the motion detection method applied to an input image according to one embodiment of the invention. The first video Y1 includes a first image frame F1 and a second image frame F2. After the motion detection unit 14 performs motion detection, two moving objects are detected in the first video Y1, including the first object obj1 (a car) and the second object obj2 (a person). The motions are exaggerated in FIG. 5 to clearly illustrate the concept. In real cases the image difference between two consecutive image frames, such as the distance between the locations of a moving object in the two frames, may be smaller than that shown in FIG. 5.

The depth calculation unit 16 calculates the depth of the first object D(obj1) as 25 m and the depth of the second object D(obj2) as 2 m. Assume the predetermined threshold distance $D_{th}$ is 10 m, the determination unit 18 determines the second object obj2 as a concerned event, and hence informs the user a motion exists in the first video Y1. In contrast, if there is only the first object obj1 existing in the first video Y1, the first object obj1 is not determined as a concerned event and the user is not informed because the depth of the first object D(obj1) is greater than the predetermined threshold distance $D_{th}$.

The motion detection unit 14, the depth calculation unit 16, and the determination unit 18, may be implemented by software, such as programs executed by a processor. The programs may be stored in a non-transitory computer readable medium from which the processor loads and executes the programs. The processor may be coupled to the first storage unit 12 to read the image data of the first video Y1. Alternatively, the motion detection unit 14, the depth calculation unit 16, and the determination unit 18 may also be implemented by hardware, such as digital signal processing circuits (DSP) with specific functions, in order to achieve high efficiency and low power requirements. The motion detection unit 14, the depth calculation unit 16, and the determination unit 18 in the following description may also be implemented by software, hardware, or software hardware integration, and will not be described repeatedly.

The motion detection device disclosed in the present embodiment utilizes the depth of the moving object as an auxiliary determination criterion. The procedure related to a concerned event, including a notification sent to the user, is trigged only when the depth of the moving object is within a specific depth range. Therefore the probability of false alarms can be reduced effectively. For example, a motion happens far way from an IP camera used for home surveillance is not an event the user concerns. The motion detection device in the present embodiment prevents a distant moving object being regarded as a concerned event, which enhances the convenience of usage. In addition, the storage space as well as the network bandwidth is saved effectively because the number of video clips including concerned events are reduced.

The Second Embodiment

Figure 2:
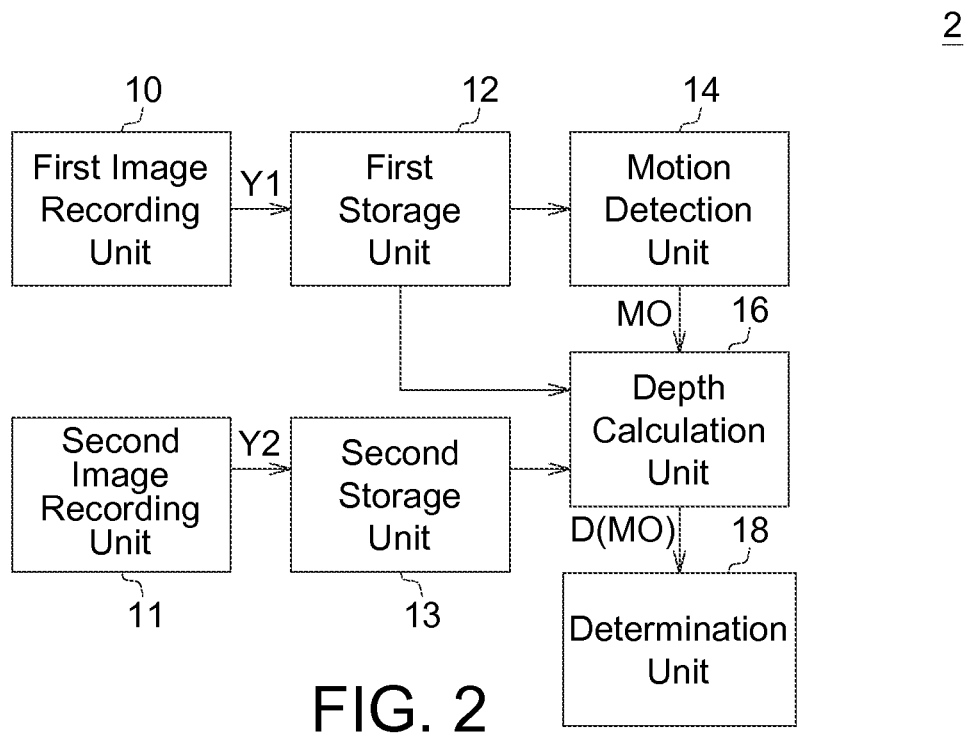
FIG. 2 shows a block diagram of a motion detection device according to the second embodiment of the invention.

FIG. 2 shows a block diagram of a motion detection device 2 according to the second embodiment of the invention. Compared to the motion detection device 1 in the first embodiment, the motion detection device 2 further includes a second image recording unit 11 and a second storage unit 13. The second image recording unit 11 is configured to record a second video Y2 at the same time as the first image recording unit 10 records the first video Y1. The first video Y1 and the second video Y2 are captured from different angles. The second storage unit 13 is configured to store the second video Y2.

The second image recording unit 11 may also include a lens and an image sensor, such as CCD or CMOS sensor. The second image recording unit 11 and the first image recording unit 10 record simultaneously and capture images from substantially the same location. For example, the first image recording unit 10 and the second image recording unit 11 may be two approximately parallel lenses with two corresponding image sensors disposed in an IP camera. The second image recording unit 11 may be disposed a specific distance from the first image recording unit 10, such that the first video Y1 and the second video Y2 are captured from different angles. The depth calculation unit 16 may calculate the depth of the moving object D(MO) according to the first video Y1 and the second video Y2.

For example, the first video Y1 provides a normal video to be watched by the user. The second video Y2 however mainly serves the purpose of assisting the depth calculation unit 16 to calculate the depth. The user does not have to watch the second video Y2. The first image recording unit 10 may be equipped with an image sensor with better resolution, such as Full HD (1080p) or HD (720p). On the other hand, the second image recording unit 11 may be equipped with an image sensor with lower resolution, such as VGA (480p).

Based on the videos captured from different angles, the depth of objects may be calculated according to the principle of parallax. The depth calculation is related to the spacing between the first image recording unit 10 and the second image recording unit 11. Because the second video Y2 is mainly used for depth calculation instead of being watched, the lower resolution image sensor may be adopted in the second image recording unit 11 to save hardware cost and storage space. The first storage unit 12 and the second storage unit 13, storing the first video Y1 and the second video Y2 respectively, may be the different blocks with different addresses in the same physical memory, or may also be separate physical memory devices.

The Third Embodiment

Figure 3:
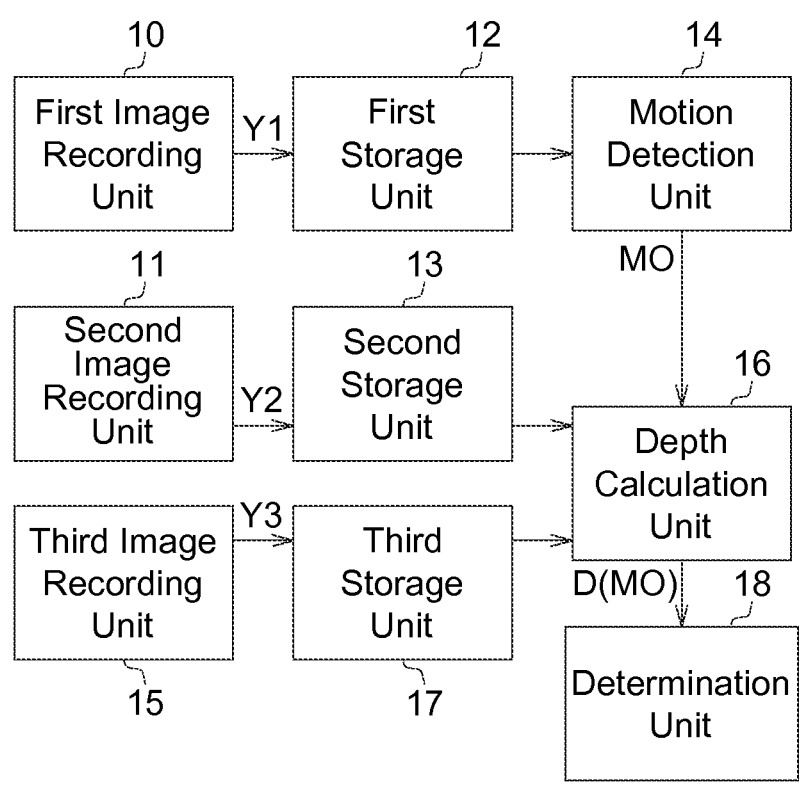
FIG. 3 shows a block diagram of a motion detection device according to the third embodiment of the invention.

FIG. 3 shows a block diagram of a motion detection device 3 according to the third embodiment of the invention. Compared to the motion detection device 2 in the second embodiment, the motion detection device 3 further includes a third image recording unit 15 and a third storage unit 17. The third image recording unit 15 is configured to record a third video Y3 at the same time as the second image recording unit 11 records the second video Y2. The second video Y2 and the third video Y3 are captured from different angles. The third storage unit 17 is configured to store the third video Y3.

The third image recording unit 15 also includes a lens and an image sensor. The first image recording unit 10, the second image recording unit 11, and the third image recording unit 15 record simultaneously and capture images from substantially the same location. For example, three approximately parallel lenses with three corresponding image sensors are disposed in an IP camera. The third image recording unit 15 may be disposed a specific distance from the second image recording unit 11, such that the second video Y2 and the third video Y3 are captured from different angles. The depth calculation unit 16 may calculate the depth of the moving object D(MO) according to the second video Y2 and the third video Y3.

In this embodiment, the second image recording unit 11 and the third image recording unit 15 provide the second video Y2 and the third video Y3 for depth calculation, while the first image recording unit 10 provides the first video Y1 to be watched by the user. Similar to the second embodiment, the image resolution of the third video Y3 recorded by the third image recording unit 15 may be lower than the image resolution of the first video Y1 in order to save hardware cost and storage space. In addition, the image resolution of the second video Y2 may be equal to the image resolution of the third video Y3 in order to facilitate calculation of the depth of the moving object D(MO). For example, each of the second image recording unit 11 and the third image recording unit 15 may be equipped with an image sensor with VGA resolution (480p).

In this embodiment, the first video Y1 may be used in motion detection only and not be used in depth calculation. The depth calculation unit 16 calculates the depth of the moving object D(MO) according to the second video Y2 and the third video Y3. The motion detection unit 14 and the depth calculation unit 16 rely on different video source files and hence can operate independently.

Figure 4:
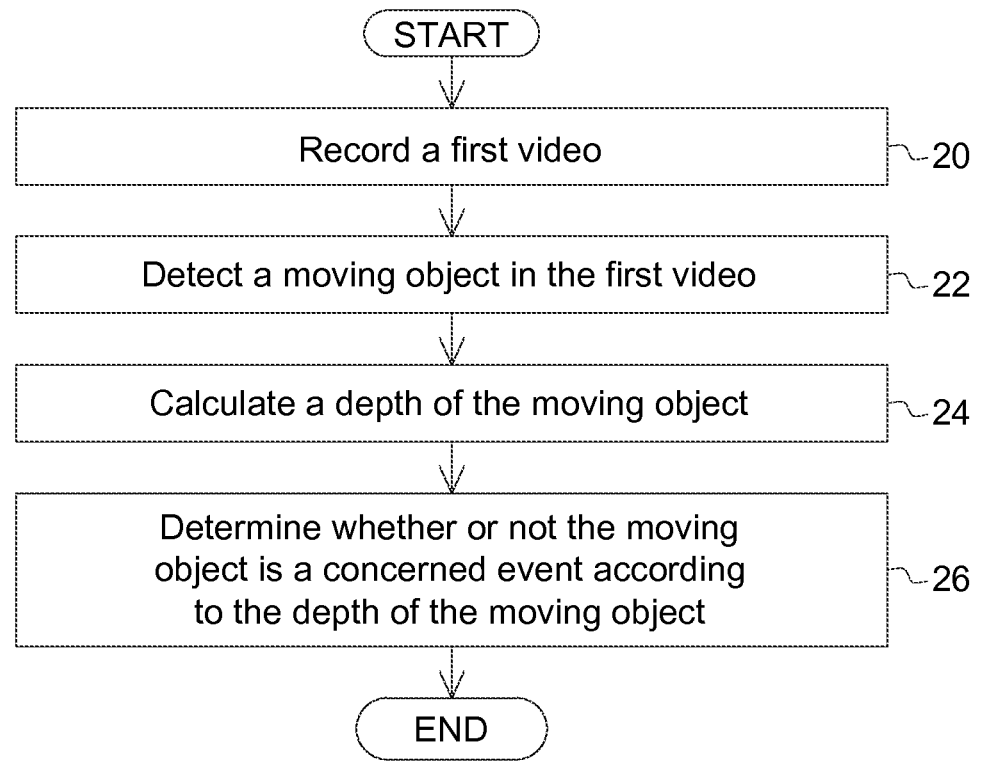
FIG. 4 shows a flowchart of a motion detection method according to one embodiment of the invention.

A motion detection method is also disclosed. FIG. 4 shows a flowchart of a motion detection method according to one embodiment of the invention. The motion detection method includes the following steps: in step 20, recording a first video Y1, which may be carried out by a lens with an image sensor. The first video Y1 may be stored in a memory device. In step 22, detecting a moving object MO in the first video Y1, which may be carried out by a general purpose processor or an application specific DSP. In step 24, calculating a depth of the moving object D(MO), such as depth estimation from a single image or depth estimation from multiple images captured from different angles according to the principle of parallax, In step 26, determining whether or not the moving object MO is a concerned event according to the depth of the moving object D(MO). In one embodiment, when the depth of the moving object D(MO) is within a predetermined distance range (such as smaller than a predetermined threshold distance DO, the moving object MO is determined as the concerned event.

The execution order of step 22 and step 24 is not limited to the flowchart shown in FIG. 4. For example, the depth map of the entire image may be calculated first. The motion detection step is performed while generating the depth map to detect the motion object MO. And then the depth of the moving object D(MO) is obtained according to the location of the moving object MO in the depth map.

In the disclosed motion detection method, videos captured from different angles may assist the depth calculation step. In addition, the videos that do not serve the purpose of being watched by the user may use lower image resolution to save hardware cost. In one embodiment, the first video Y1 provides a normal video to be watched by the user. The depth calculation step may depend on the first video Y1 and the second video Y2. In another embodiment, the depth calculation step may depend on the second video Y2 and the third video Y3. The detailed description has been given in the second and third embodiments and is not repeated here.

The motion detection method disclosed in the present embodiment determines whether a moving object is a concerned event according to the depth of the moving object. The motion that is not of interest may be filtered out to reduce the probability of false alarms. The user does not have to examine video clips frequently while most of the clips do not contain real concerned events. The motion detection method may be applied to a surveillance system, such as IP camera and CCTV, to enhance the convenience of usage.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A motion detection device, comprising:
a first image recording unit disposed in a camera, configured to record a first video;
a first storage unit, configured to store the first video;
a motion detection unit, configured to detect a moving object in the first video;
a depth calculation unit, configured to calculate a depth of the moving object;
a determination unit, configured to determine the moving object as the concerned event and send an alert to caution the concerned event has occurred when the depth of the moving object, which is a distance between the moving object and the camera, is smaller than a predetermined threshold distance;
a second image recording unit disposed in the camera, configured to record a second video at the same time as the first image recording unit records the first video, the first video and the second video being captured from different angles, a second image resolution of the second video being lower than a first image resolution of the first video; and
a third image recording unit disposed in the camera, configured to record a third video at the same time as the second image recording unit records the second video, the second video and the third video being captured from different angles;
wherein the depth calculation unit calculates the depth of the moving object according to the second video and the third video.

2. The motion detection device according to claim 1, further comprising:
a second storage unit, configured to store the second video.

3. The motion detection device according to claim 1, further comprising:
a second storage unit, configured to store the second video; and
a third storage unit, configured to store the third video.

4. The motion detection device according to claim 1, wherein a third image resolution of the third video is lower than the first image resolution of the first video, and the second image resolution of the second video is equal to the third image resolution of the third video.

5. A motion detection method applied to a motion detection device, comprising:
recording a first video by a first image recording unit in a camera;
recording a second video at the same time as the first video is recorded, the first video and the second video being captured from different angles, and a second image resolution of the second video being lower than a first image resolution of the first video;
recording a third video at the same time as the second video is recorded, the second video and the third video being captured from different angles;
detecting a moving object in the first video by a motion detection unit;
calculating a depth of the moving object by a depth calculation unit; and
determining the moving object as the concerned event and sending an alert to caution the concerned event has occurred by a determination unit when the depth of the moving object, which is a distance between the moving object and the camera, is smaller than a predetermined threshold distance;
wherein the depth of the moving object is calculated according to the second video and the third video.

6. The motion detection method according to claim 5, wherein a third image resolution of the third video is lower than the first image resolution of the first video, and the second image resolution of the second video is equal to the third image resolution of the third video.

* * * * *